April 2, 1957  J. A. MACH  2,787,234
HOLDER OR SETTER FOR WELDING
Filed July 19, 1955
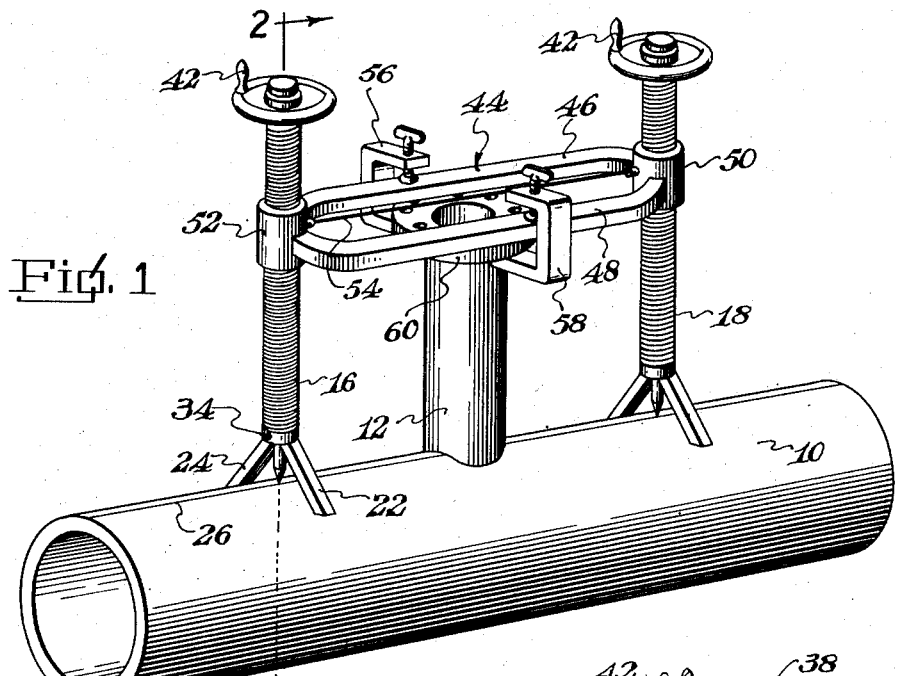
Fig. 1
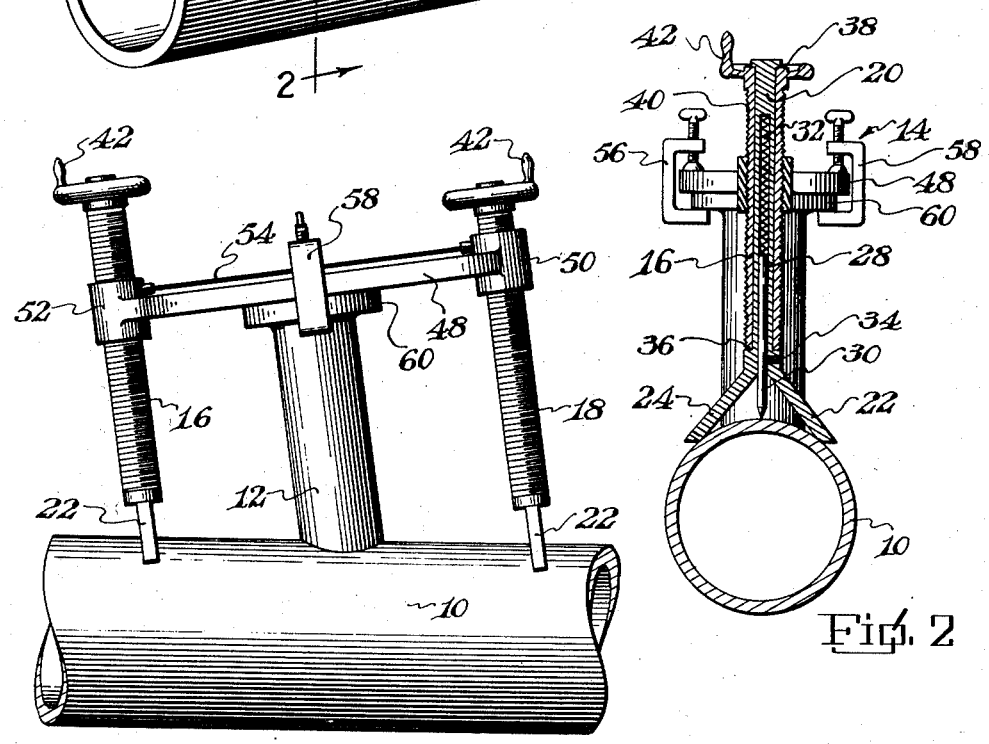
Fig. 2
Fig. 3

United States Patent Office 2,787,234
Patented Apr. 2, 1957

2,787,234
HOLDER OR SETTER FOR WELDING
Joseph A. Mach, Tulsa, Okla.
Application July 19, 1955, Serial No. 523,039
3 Claims. (Cl. 113—102)

This invention relates to improvements in work holders for holding a work piece in accurate, predetermined relation to another work piece, while they are being joined together and is particularly directed to an improved and novel setter or holder for welding tubular stock together in angular relationship.

Particularly, though not restrictively, the setter or holder of the present invention is of use in welding a nozzle to a pipe at the correct angle thereto and, generally, the setter or holder is of use in welding all types of tubular stock together, especially prefabricated sections for refinery construction.

A primary object of this invention is to provide a welding setter or holder which will accurately and easily set and hold a tubular member in the correct angular relationship to another tubular member so that they may be welded together in such relationship.

Another important object of this invention is to provide a welding setter or holder which includes end assemblies that are provided with lower centering ends for centering the end assemblies upright on a pipe or the like cylinder and which carry externally threaded rotating sleeves on which bushings are threaded, the bushings adjustably supporting a frame, which extends between the end assemblies and is adapted to hold and set a tubular member on the pipe at the correct angle thereto.

A further object of this invention is to provide a welding setter or holder which has accurate means for centering it on a pipe and which includes a frame that is easily adjusted to move and hold a nozzle or the like in the correct angular relationship on a pipe or the like.

A further object of this invention is to provide a simple, compact and easily operated welding setter or holder which will hold a nozzle or the like on a pipe at the correct angle for welding and which can be reliably used by even inexperienced workmen without any guess work on their part.

These and ancillary objects are attained by this invention, the preferred form of which is set forth in the following description and illustrated in the accompanying drawing, wherein;

Fig. 1 is a view in perspective of the setter or holder, showing the same in use and holding a nozzle in 90 degree angular setting on a pipe;

Fig. 2 is a vertical sectional view of one of the end assemblies and is taken on line 2—2 of Fig. 2, and, Fig. 3 is a side elevational view of the setter or holder, showing the frame thereof tilted for setting the nozzle on the pipe at less than a 90 degree angle.

Referring now more particularly to the accompanying drawing, the numeral 10 generally designates a tubular pipe, such as a manifold, to which a nozzle 12, for example, is to be welded, either at a right angle thereto (Fig. 1) or at an angle of less than 90 degrees (Fig. 3). Such elements are, of course, exemplary only of the environment for the welding setter or holder 14.

The welding setter 14, which is particularly, though not exclusively, designed for tubular stock includes identical upright end assemblies 16 and 18. Such assemblies comprise shafts 20 which terminate at their lower ends in outwardly diverging centering feet 22 and 24. The lower ends of the shafts are bifurcated at nearly 90 degrees to form the integral centering feet which are adapted to seat on the pipe and span the center line 26, as will be described.

The shafts are formed with axial bores 28, which open through the lower ends thereof and which terminate below the upper ends to form housings for centering pins 30. The centering pins project below the shafts and lie between the opposing centering feet and are adapted to be centered on the center line 26. The pins 30 are spring urged by compression springs 32 which back the pins that are held in axially set positions by set screws 34; the set screws 34 extend radially through the lower ends of the shafts.

The shafts are provided at their lower ends with upwardly facing shoulders 36 and their upper ends are coaxially enlarged to form downwardly facing shoulders 38. Tubular sleeves or hollow shafts 40 are rotatably circumposed on the shafts 20 and bear against the shoulders so as to be located thereby against axial movement. The sleeves are externally threaded throughout their lengths and terminate at their upper ends in integral hand wheels 42.

An elliptical shaped open frame 44 is carried by the sleeves of the end assemblies and extends therebetween. The frame has parallel sides 46 and 48 and the ends thereof are constituted by vertically disposed, internally threaded bushings 50 and 52. The bushings are threaded on the sleeves 40 and the frame is adjustably supported thereby.

A wire or similar thin element 54 is secured between the bushings, parallel with and centrally located between the sides 46 and 48 of the frame and is adapted to overlie the center line 26.

U clamps 56 and 58 are attachable to the sides of the frame and serve to clamp the flange 60 of the nozzle to the under side of the frame so that the nozzle securely depends from the frame.

In use, an operator scribes the center line 26 longitudinally on the pipe, intersecting the opening therein, at which point the nozzle is to be welded. The flange of the nozzle is clamped to the sides of the frame by the U clamps and by means of the hand wheels, the nozzle is lowered onto the pipe and held in proper relationship therewith during the welding operation. The legs of each upright end assembly may be slid longitudinally of the pipe or oscillated back and forth so that the centering pins are exactly on the centering line 26.

By rotating one of the sleeves 40 more than the other, one of the bushings may be lowered more than the other to tilt the frame 44 (Fig. 3) and set the nozzle to certain angular limits off of the 90 degree angle.

To ensure that the axis of the nozzle is disposed exactly 90 degrees to the long axis of the pipe, a spirit level can be used to level the pipe longitudinally. The level is then placed on the frame 44 which can be leveled by using the hand wheels of the end assemblies. When the frame is level, the flange, clamped thereto by the U clamps, will also be level with the pipe and the axis of the nozzle will be exactly 90 degrees from the center axis of the pipe. The wire 54 aids in accurately mounting the flange to the frame.

While the best known form of this invention has been described herein and illustrated in the accompanying drawing, other forms may be realized as come within the scope of the invention defined by the appended claims.

I claim:

1. A welding setter for setting a nozzle or the like tubular member having a flanged outer end in accurate angular relationship with a pipe for welding the inner end of the nozzle to the pipe, said setter comprising spaced apart, upstanding shafts having lower ends provided with outwardly diverging centering feet adapted to straddle and seat on the pipe, said shafts having centrally disposed, axial bores extending through their lower ends, centering pins housed in the bores and movable axially therein to selected positions projecting from the lower ends of the shafts, said pins being disposed between the centering feet, means carried by the shafts for securing the pins in selected positions, externally threaded sleeves rotatably circumposed on the shafts, a frame disposed between the shafts, vertical bushings provided at the ends of the frame, said bushings being threaded on the sleeves, means for rotating the sleeves to raise and lower the bushings and frame thereon and means for attaching a nozzle to the frame so that it is suspended therefrom.

2. A welding setter as claimed in claim 1, wherein said pins are backed by compression springs seated in the inner ends of the bores and said means for securing the pins in selected positions includes radial set screw carried by the shafts and entending into the bores.

3. A welding setter as claimed in claim 1, wherein said frame is open and has spaced apart sides and said means for attaching a nozzle to the frame includes clamps secured on the sides and engageable with the flange on the nozzle and a guide wire extending between the ends of the frame along the longitudinal center line of the frame.

References Cited in the file of this patent

UNITED STATES PATENTS

| | | |
|---|---|---|
| 1,460,344 | Kager | June 26, 1923 |
| 2,387,154 | Kalwitz | Oct. 16, 1945 |
| 2,585,343 | Newlon | Feb. 12, 1952 |
| 2,689,412 | Young | Sept. 21, 1954 |